(12) United States Patent
Peyton et al.

(10) Patent No.: US 12,035,732 B1
(45) Date of Patent: Jul. 16, 2024

(54) COMPOSITION OF MATTER AND METHOD OF USE FOR WINE HEALTH MIXTURES

(71) Applicants: Thomas O. Peyton, Lafayette, IN (US); William Bray, Lafayette, IN (US); Stephen Bruhn, West Lafayettes, IN (US); Julie Ginn, Lafayette, IN (US); Amanda J. Rumba, Lafayette, IN (US)

(72) Inventors: Thomas O. Peyton, Lafayette, IN (US); William Bray, Lafayette, IN (US); Stephen Bruhn, West Lafayettes, IN (US); Julie Ginn, Lafayette, IN (US); Amanda J. Rumba, Lafayette, IN (US)

(73) Assignee: Nouv Eau Inc., Lafayette, IN (US)

( * ) Notice: Subject to any disclaimer, the term of this patent is extended or adjusted under 35 U.S.C. 154(b) by 41 days.

(21) Appl. No.: 16/261,033

(22) Filed: Jan. 29, 2019

Related U.S. Application Data

(60) Provisional application No. 62/623,285, filed on Jan. 29, 2018.

(51) Int. Cl.
| | | |
|---|---|---|
| *A23L 2/02* | (2006.01) | |
| *A23L 2/38* | (2021.01) | |
| *A23L 2/385* | (2006.01) | |
| *A23L 2/56* | (2006.01) | |
| *A23L 2/60* | (2006.01) | |
| *A23L 27/00* | (2016.01) | |

(52) U.S. Cl.
CPC ............... *A23L 2/02* (2013.01); *A23L 2/385* (2013.01); *A23L 2/56* (2013.01); *A23L 2/60* (2013.01); *A23L 2/382* (2013.01); *A23L 27/88* (2016.08); *A23V 2002/00* (2013.01)

(58) Field of Classification Search
CPC ..... A23L 2/56; A23L 2/60; A23L 2/02; A23L 2/385; A23L 2/382; A23L 27/88; A23L 2/38; A23L 23/10
USPC ........................................................ 426/590
See application file for complete search history.

(56) References Cited

U.S. PATENT DOCUMENTS

| | | | | |
|---|---|---|---|---|
| 2,647,058 A * | 7/1953 | Schapiro | ............ | A23L 2/02 426/655 |
| 3,052,546 A * | 9/1962 | Riddell | ............ | C12H 3/02 426/15 |
| 4,643,083 A * | 2/1987 | Boucher | ............ | C12H 6/02 99/275 |
| 2004/0219274 A1* | 11/2004 | Cook | ............ | A23L 33/15 426/590 |
| 2009/0297681 A1* | 12/2009 | Wilkes | ............ | A23L 2/02 426/534 |
| 2014/0166699 A1* | 6/2014 | Stehli, Jr. | ............ | B65D 83/0055 222/209 |
| 2015/0182455 A1* | 7/2015 | Llamas | ............ | C12C 11/003 514/729 |
| 2016/0267571 A1* | 9/2016 | Fugere et al. | ............ | G06Q 30/0627 |
| 2016/0360765 A1* | 12/2016 | Cates | ............ | A23L 19/03 |
| 2017/0172977 A1* | 6/2017 | Kleidon | ............ | A61K 8/922 |

OTHER PUBLICATIONS

NPL Oz vs glass (Retrieved on Mar. 26, 2021). (Year: 2021).*
NPL Hines et al. (2017). (Year: 2017).*
NPL Mermelstein et al. [in Food Technology vol. 63(11): 2009]. (Year: 2009).*
NPL Non alcoholic food (2010; https://www.carbmanager.com/food-detail/md:cfdf094b7d3e8e192a99bda58347ea4e/cabernet-sauvignon-premium-dealcoholized-wine [See last page has copyright 2010-2023]. (Year: 2010).*
NPL Grape sugar (Retrieved on Jun. 2023). (Year: 2023).*

* cited by examiner

*Primary Examiner* — Erik Kashnikow
*Assistant Examiner* — Bhaskar Mukhopadhyay

(57) ABSTRACT

The disclosed invention is a concentrated liquid beverage enhancer for wine health mixtures. There is a demand for healthy and natural food products. The world's and United States leading cause of death is cardiovascular disease (CVD) from heart attacks, strokes, and dementia due to diet, environmental and genetic factors among other cofactors such as obesity and lack of exercise. In the 1990's drinking several glasses of red wine a day was found as reducing CVD and extensive research has since resulted in countless scholarly articles, patents and patent applications on the beneficial use of red wine extracts in food as dietary supplements. In this invention we provide a novel composition of mixtures with wine extract that are flavorful and stable for bulk transport up to a concentration where 4-5 ml equals a 150 ml glass of red wine with a convenient means for the consumer to add 1 glass of wine equivalent to enhance their food or beverage.

4 Claims, 2 Drawing Sheets

FIGURE 1

Colony Forming Units (cfu/mL) in EXAMPLE 1

|   | Treatment | 30 day Temp-C |  | yeasts | mould | Total heterotroph | E. coli | start pH | end pH |
|---|---|---|---|---|---|---|---|---|---|
| a | cold | 37 | KBT concentrate | 23,000 | 1000 | 18,000 | <1 | 3.45 | 3.70 |
| b | cold-cold | 37 | KBT beverage carbonated | <1 | <1 | <1 | | | 3.95 |
| c | cold | 37 | KBT-Pr concentrate | <1 | <1 | <1 | | 3.35 | 3.47 |
|   | cold | 37 | KBT-Pr concentrate for | | | | | | |
|   | cold-hot | | sugar nutraceutical hotfill | | | | | | |
|   | cold-cold | | sugar beverage carbonation | | | | | | |
| d | hot | 37 | KBT-Pr concentrate | <1 | <1 | <1 | | 3.35 | 3.51 |
|   | hot | 37 | KBT-Pr concentrate for | | | | | | |
|   | hot-hot | | sugar nutraceutical hotfill | | | | | | |
|   | hot-cold | | sugar beverage carbonation | | | | | | |
| i | cold | 37 | KBT-Pr-S concentrate | 180 | 10 | 290 | <1 | 3.10 | 3.40 |
|   | cold | 37 | KBT-Pr-S concentrate for | | | | | | |
| j | cold-hot | | nutraceutical hotfill | <1 | 6 | <1 | | | 3.51 |
| k | cold-cold | | beverage carbonation | | | | | | |
| l | hot | 37 | KBT-Pr-S concentrate | <1 | 100 | <1 | | 3.10 | 3.39 |
|   | hot | 37 | KBT-Pr-S concentrate for | | | | | | |
| m | hot-hot | | nutraceutical hotfill | <1 | 3 | <1 | | | 3.50 |
|   | hot-hot | | beverage carbonation | | | | | | |
|   | cold-hot | 22 | KBT-Pr-S nutraceutical | | | | | | |
| m | hot-hot | 22 | KBT-Pr-S nutraceutical | <1 | <1 | <1 | | | 3.56 |
| n | hot | 37 | KBT-Pr-S beverage carb | 1 | 2 | <1 | | | 3.74 | note: all nutraceutical samples hot filled at 185 F
all hot treatments were hot filled at 185 F

COMPOSITION OF MATTER AND METHOD OF USE FOR WINE HEALTH MIXTURES

CROSS-REFERENCE TO RELATED APPLICATIONS

This application claims the benefit of provisional patent application Ser. No. 62/623,285, filed Jan. 29, 2018 by the present inventors.

FEDERALLY SPONSORED RESEARCH

Not Applicable

SEQUENCE LISTING OR PROGM

Not Applicable

BACKGROUND OF THE INVENTION—FIELD OF THE INVENTION

The invention relates to a composition of matter mixture of primarily whole wine extract that provides the health benefits of wine without the alcohol as a stable and tasteful concentrate to make functional dietary supplements and beverages.

BACKGROUND OF THE INVENTION—RELATED ART

There is a demand for healthy and natural food products. The world's and United States leading cause of death is cardiovascular disease (CVD) from heart attacks, strokes, and dementia due to diet, environmental and genetic factors among other cofactors such as obesity and lack of exercise. In the 1990's drinking several glasses of red wine a day was found as reducing CVD and extensive research has since resulted in countless scholarly articles, patents and patent applications on the beneficial use of red wine extracts in food as dietary supplements. In this invention we provide a novel composition of mixtures with wine extract that are flavorful and stable for bulk transport up to a concentration where 5 ml equals a 150 ml glass of red wine with a convenient means for the consumer to add 1 glass of wine equivalent to enhance their food or beverage. In the preferred embodiment the concentrate has no water added other than naturally from wine but has liquid form.

It is common medical knowledge that a diet rich in fruit and vegetables that includes a glass or two of red wine per day helps prevent heart disease. This medical knowledge is based upon the Mediterranean Paradox where the only substantiated epidemiological studies confirm that the general population of moderate and daily red wine consumers in Spain, Italy and France have demonstrated significantly lower incidents of CVD and greater longevity than in western countries. This observation is felt in part due to a staple diet rich in polyphenolics from fruits and vegetables "the Mediterranean diet," where polyphenolics are found in roughage (eg skin and seeds) even though the roughage is not readily assimilated after 8 hours of digestion of the epidural and fibrous tissue in the human gut. On the other hand, the polyphenolics in red wine, such as flavonols, flavanoids stilbenes, phenols, etc. found in the grape skins and seeds, are macerated, fermented and digested together with the juice for 300-400 hours and become more bioavailable and more readily assimilated by the human gut. In France, epidemiological studies have shown that red wine consumption imparts a CVD health benefit to those who even consume an otherwise unhealthy diet rich in saturated fat and are overweight. This anomaly is more often referred to as the French Paradox. Therefore, red wine consumption and their polyphenolics are indicated as the primary correlate to improved cardiovascular health. In addition to the epidemiological studies on human populations, polyphenolics in red wine (and red wine extract) have been identified from numerous in vitro and in vivo animal studies as primarily responsible for reducing hypertension, arterial relaxation through NO production, inhibiting LDL oxidation, improving thrombolysis (plaque dissolving), inhibiting platelet aggregation and the lowering of other CVD events such as atherosclerosis.

Polyphenolics are deemed to be responsible for the lower incidence of CVD and increased longevity of the Mediterranean population that consume red wine moderately and on a daily basis. A stilbene polyphenolic identified in red wine, resveratrol, was widely publicized to be thought to be solely responsible for wine's health benefit. But it is found that resveratrol alone added or compared to red wine shows no added health benefit and confirmed in Italian epidemiological studies of human populations. Resveratrol has a very low biological half-life: is poorly absorbed, and rapidly metabolized and excreted and shown to not have a significant influence on health and mortality risk. Though wine polyphenolics possess antioxidant properties that neutralize toxins known as free radicals, it is not just the measure of antioxidant value that is responsible for red wine's health benefit. Many inorganic and organic chemicals have high antioxidant properties that are not beneficial and can even be toxic. Wine's polyphenolic CVD benefit appears to be due to a combined effect of many of its polyphenolics acting together to directly induce wine's positive metabolic CVD effect at the cellular and molecular level in specific structure activity relation against the targeted antagonist receptors where the mode of action includes anti-oxidation, such as inhibiting low density lipoprotein (LDL) oxidation rates. A red wine extract without alcohol is thought to be more beneficial than red wine itself where the alcohol and its toxic acetaldehyde metabolic product contradicts the health benefit. Population subgroups such as Asian-American Indian and African, have genetic linked enzyme factors that lower the rate of acetaldehyde dehydrogenase resulting in greater levels of acetaldehyde pools in their system hence toxin effects when consuming alcohol.

A 5 ounce glass of red wine (approx 150 ml) is often measured in polyphenolic equivalence as approximately 100-300 milligms of pure red wine polyphenolics a glass. There is a need for a convenient means to provide the consumer with the health benefit of whole red wine without alcohol, that is low in calories and with or without admixtures of other healthful and beneficial ingredients, in a one glass equivalent portion of red wine for use at the consumers convenience.

This innovative invention is a tasteful and stable liquid mixture that includes primarily whole wine concentrate from extracts where 1 to 2 teaspoons (5-10 ml) equals a glass of wine depending on whether enhanced sweetener or grape sugar is used to counteract the bitter astringency of wine extract as determined by organoleptic trial. The concentrate can be stored and transported in bulk as a syrup to make ready to drink beverages or delivered to the consumer as a dietary supplement as a liquid beverage (water) enhancer with other beneficial ingredients, such as Vitamin B's, dispensed by the consumer from 5 to 10 ml portions to equal a glass of wine or consumed directly as teaspoon measure.

Additionally, this invention provides a tasteful and stable concentrate of red wine polyphenolics at 2-8% (20-80 gms/liter based on a 35:1 vacuum distilled dealcoholized liquid extract of red wine), wherein a 5 ml serving equals the polyphenolics in a glass of red wine, (100-300 mgs/glass).

This invention more specifically also provides a means of delivery dispensed by the consumer by squeezing or pouring from a 50-250 ml bottle as a liquid beverage (water) or food enhancer and dietary supplement in approximate glass of wine equivalent measure, such as a teaspoon amount. The serving can be added to any food or beverage at the consumers preference.

Wilkes et al in U.S. Pat. No. 9,445,623 makes a non-alcoholic wine beverage with about 150-700 mgs of polyphenolics in 6-8 ounces (0.6%-4% gms/liter) from wine extracts including resveratrol as a base of dealcoholized wine extract that can make up 45% to about 55% of the bases volume to make a ready to drink carbonated beverage. Wilkes et al. base is unlike this invention where in our invention the product itself is made up to 80-90% by volume from whole red or white wine extract without resveratrol added and is used as a syrup or concentrate to be dispensed in portions as a liquid beverage (water) enhancer as glass of wine equivalent in 1 teaspoons to the consumers preference to any beverage or food of their liking. Furthermore, resveratrol as used by Wilke's et al invention has been disproven as the "magic bullet" of red wines health benefit. Howard et al. in U.S. Pat. No. 6,642,277 makes a highly concentrated polyphenolic dry powder of about 75% polyphenolic concentration as a red wine and grape juice dry extract for delivery in pill or admixture in liquid form and demonstrates with human subjects that polyphenolic powders from grape wine had effect on inhibiting LDL oxidation where 1 gm of his powder was equivalent to one-half bottle of red wine (300 mgs/glass). No effect was observed for white wine extracts and select extracts from grape skins, red wine pomace, grape seed extract or green tea extract. Howard's mode of delivery is by dry powder from ion exchange eluates of red wine polyphenolics and unlike our invention is not from whole red wine reduction through vacuum distillation and does not provide a means for the liquid concentrate to be flavorfully blended before dispensing in glass of red wine equivalent portions.

Draijer et al in US Patent Application 200990186119 claims a liquid food product of red grape and red wine polyphenolics at 0.1 to 1.5 wt % of polyphenols packaged in a 50 to 250 ml closed container containing 100-1500 mg polyphenols from a dry red wine extract from ion exchange eluates, Provinol®, for cardiovascular benefit in single doses within a preferred soyprotein liquid matrix including other food ingredients such as water, flavor, sweeteners, fruits, minerals, vitamins etc., such as yogurt as the final product. Draijer et al grape wine polyphenolics is not from whole red wine reduction as a liquid extract. Draijer does not specify a mode of delivery other than in single servings of the polyphenolic powders mixed in food. Whereas in our present invention a whole red wine glass equivalent is proportioned from a 35:1 wine reduction by vacuum distillation to a liquid concentrate of wine solids with formulated equivalence of red wine polyphenolics at 2-8 wt % of polyphenols, for example, packaged within a 50 ml dispensing bottle, containing 1000 to 4000 mg polyphenols per 5 ml serving as a liquid beverage enhancer and equivalent to 2 bottles of red wine in 50 ml squeeze bottle or 1 glass of red wine in a 5 ml (1 teaspoon) serving dispensed in portions at the consumers preference directly or in any beverage or food of their liking by squeezing or pouring from the 50 ml example bottle.

De Graaf et al in US Patent Application 20090123636 makes a fluid wine extract as a mixture with ethanol, wine solids, water, and acidulants where the wine solids are 25-65% of the composition (where polyphenolics are not claimed but reported at 45% ranging up to 100% polyphenols of the wine solids on line 0022 and 0023) at a pH between 1.5-5.0, most preferred pH 2.6-4.0; and claims functional food products with this extract where the concentration of the extract in the food is 0.01-1%. De Graaf discusses dosing through a nozzle (line 0020) and desired food level of dosed polyphenols 150 mg to 2000 mg (line 0029). DeGraaf et al's claimed (claim 3) dosing levels of 0.01-1% in food are achieved ambiguously and are incorrect to reach a glass of red wine equivalent level as otherwise presented in this our invention. First De Graaf et al derive their red wine solids and fluid extract by distillation of alcohol and removing the remaining liquid (line 0053) under reduced pressure (vacuum distillation) with no relation of the amount of red wine vacuum distilled to the amount of fluid extract obtained and wrongly assumes the remaining solids are 100% polyphenols, which would need to by ion exchange purified, such as Provinol®. Red wine typically contains 2-3% non-volatile solids and 0.1-0.3% polyphenols, typically 0.2% polyphenols. A 35:1 vacuum distillation of red wine (35 liters red wine=1 kg fluid extract) used in this our invention reported a residual moisture content of 60% and dry solids content of 40%. Therefore a glass of wine equivalent (150 ml) would be 4.2 gms of the fluid extract containing roughly 200 mg of red wine polyphenol. DeGraaf et al's fluid wine extract is made up to 65% wine solids and their maximum dose in food of 1% fluid extract (0.65% wine solids), would, for example in a 150 ml glass of water, be 1.5 gms of fluid extract containing less than 75 mg polyphenols, far less than the desired dose level at maximum dose of a desired food level 150 mg to 2000 mg polyphenols. In other words, DeGraaf et al would not be able to achieve their desired food level of polyphenol at claimed maximum dose nor equate a dose to a glass of red wine in his method provided. DeGraaf et al do not specify the red wine dry solids they use to make a fluid composition (line 0054) but even if all the moisture were removed from a vacuum distilled red wine solid, they would not be able to achieve the minimum dose of polyphenols required under their specified dose regime of a maximum of 1% in food to achieve at least 150 mg let alone 2000 mg polyphenol.

Kang et al in U.S. Pat. No. 9,861,122 claims a method of adding a shelf stable and highly concentrated liquid beverage enhancer with flavor and color through a squeeze bottle that can deliver as low as 2 ml of concentrate to an 8 ounce serving, a dispensing method developed by Kraft for the MIO® product line of liquid water enhancer. Kang et al stabilize their concentrate by adding humectants, such as propylene glycol and vegetable glycerin to >10% liquid solids to reduce water activity to levels that prevent the growth of most food spoilage microorganisms while maintaining a pH level above 4.6. They specifically claim a method to enhance milk by squeezing pouring or dripping from a bottle. Our present invention advances the state of the art over Kang et al by providing a highly concentrated red wine extract mixture at a concentration where one squeeze is equivalent to the functional benefits of a glass of red wine as a liquid beverage enhancer.

Patents and patent applications of indirect relevance with related material are: U.S. Pat. No. 6,387,370 "Compositions Containing Extracts Of Polyphenols To Reduce Atherosclerosis". U.S. Pat. No. 6,572,899 Memory Loss Treatment Formulation". US Publication 20040023894 "Synergistic Antioxidant Combination Of Delta Tocol". US Publication 2006/0039972 "Effervescent Composition Including A Grape Derived Component". US Publication 2007/0077279 "Novel Composition Containing Polyphenols". US Publication 20080254135 "Resveratrol Containing Composition For General Health And Safety". US Publication 20090110789 "Antiooxidant Drink For Dietary Supplement". US Publication 2013/0017182 "Multi-Criteria Optimized Dietary Supplement Formulations". US Publication 20150125548 "Combination Nutritional and Nutraceutical Products". US Publication 20170196929 "Phytoactive Based Anti-Cancer Formulation". US Publication 20150305393 "Beverage with Heart and Functional Ingredients and Process Thereof". US Publication 200901886119 "Food Composition". WO2003099042A2 "Method For Producing a Beverage Syrup and a Refreshing Beverage Prepared from Said Syrup". EP2939549A4 "Herbal Extract Composition". U.S. Pat. No. 6,238,673B1 "Method For Producing High Flavonol Content Polyphenol Compositions". U.S. Pat. No. 4,626,437A "Method For The Preparation Of Alcohol Free Wine". EP0213220A1 "Process For The Production Of Alcohol Free Beverages".

OTHER REFERENCES

Godman, H. "Diet Rich in Resveratrol Offers No Health Boost". *Harvard Health Publishing. Harvard Medical School*, May 15, 2014.
Arranz, S. et al "Wine Polyphenols: Cardioprotective Effect". *Polyphenols in Human Health and Disease*. 2014.
Cordova, A. "Polyphenols are Medicine: Is It Time to Prescribe Red Wine for Our Patients?" *Int J Angiol*. 2009 Autumn 18(3): 111-117.
Weiskirchen, S. et al "Resveratrol: How Much Wine Do You Have To Drink To Stay Healthy?" *Adv. Nutr.* 2016 July; 7(4).
Aviram, M. et al "Polyphenolic Flavonoids Inhibit Macrophage-Mediated Oxidation of LDL and Attenuate Atherogenisis". *Atherosclerosis* 1998 (137) S45-S50.
Klatsky, A. L. et al "Alcoholic Beverage Choice and Risk of Coronary Artery Disease Mortality: Do Red Wine Drinkers Fare Best?" *Am. J. Cardiology*, 1993 February (71)(5).
Gronbaek M. et al "Mortality Associated with Moderate Intakes of Wine, Beer or Spirits". *BMJ* 1995 May 310 (6988).
Mojzer, et al "Polyphenols: Extraction Methods, Antioxidative Action, Bioavailability and Anticarcinogenic Effects". *Molecules* 2016, 21, 901.
Baranchuk, A. et al "Wine and Cardiovascular Health: A Comprehensive Review". *Circulation* 2017 October 136: 1434-1448.
Podolak, R. "Acidifed Foods: Principals of Processing Commercially Sterile Acid and Acidified Food Products". *Food Products Association* 2010.
BINDER Gmbh, *Accelerated Shelf-life Testing* 2016.
Vazquez-Armenta, F J et al "Antibacterial And Antioxidant Properties Of Grape Stem Extract Applied As Disinfectant In Fresh Leafy Vegetables". *J. Food Sci Tecnol*. 2017 September 54(10):3192-3200.
Kennedy, David O. "B Vitamins and the Brain: Mechanisms, Dose and Efficacy-A Review". *Nutrients* 2016 Feb. 8(2) 68.
Lima, G. P., et al "Polyphenols in Fruits and Vegetables and Its Effect on Human Health". *Food and Nutrition Sciences* 2014 (5)(11).
Iriti, M. et al "Melatonin Content in Grape: Myth or Panacea?" *JSFA* 2006 June (86) 10.
Iriti, M. et al "Tryptophan-Ethylester, the False (unveiled) Melatonin Isomer in Red Wine". *Int J. Tryptophan Res* 2015 Mar. (8) 27-29.

BACKGROUND OF THE
INVENTION—OBJECTS AND ADVANTAGES

The objectives and advantages of our invention as discussed above in relation to the disadvantages of the prior art are numerous and several of the objects and advantages of the present invention are:
(a) to provide the benefit of the French Paradox to consumers, without the alcohol and calories of wine, in a unique and new liquid concentrate composition with a method for delivering it conveniently by consumers as a liquid enhancer to water, beverages and food.
(b) to make a stable and tasteful non-alcoholic wine extract concentrate mixture whereby 5 ml (1 tsp) equals a glass of wine's benefit with ten or fewer calories.
(c) to place into a small 50 ml (1.69 fl oz) pocket sized bottle whereby 10 servings of a 10 wine glass equivalence of concentrate can be stored and used over many days at the users preference.
(d) to serve one squeeze from this pocket size bottle in a 5 ml (1 tsp) portion.
(e) to add this portion to 150 ml of water whereby the appearance is wine and provides wine's functional health properties as a liquid water enhancer.
(f) to offset wine extract astringency with a natural sweetener and complement with beneficial ingredients such as vitamins, minerals, caffeine, cannabidiol or natural flavors to make a stable ready to drink concentrate.
(g) to maintain the concentrate with a long shelf life through water activity <0.85, pH≤3.2, pasteurization and natural preservatives as necessary, with cold filling or hot filling into containers to maintain stability and preservation.
(h) to stable transport the concentrate in bulk in 25-1000 liter quantity ready to fill or blend Application of Peyton et al, "Composition of Matter and Method of Use for Wine 10 Health Mixtures"
(i) to directly package or blend the concentrate in 40-75 ml bottles as a multi-serving liquid beverage enhancer, or single serving dietary supplement or to blend to make a mixed beverage single serving in larger container.

Grape wine is from *Vitis vinifera* (grape), and the grapes are composed primarily of water (app. 84%), sugar (app. 13%) and inorganic and organic solids (app. 3%) such as minerals, tannins, polyphenolics and other organic compounds. Red wine is fermented with the skins and seeds where a majority of the bound polyphenols are released into the wine. Red wine generally has 1-2 gms polyphenols per liter. The bottom of the fermentation vat is the skin and seed residue termed marc. Following fermentation of the sugar to alcohol the wine can be filtered such as by reverse osmosis to separate the water and alcohol from the solids, or vacuum distilled to separate the solids from the alcohol and water. The solids contain the beneficial polyphenolics and are termed red wine extract and can be obtained directly as a liquid from vacuum distillation such as a 35:1 ratio where 35-70 gms of polyphenols are concentrated in 1 kg of solids (3.5%-7% polyphenols), further dried and mixed with a binder such as dextrose in a dry powder state, or separated and highly purified further by ion exchange to yield up to 75% wine polyphenols (Provinol®). The object of this invention is to provide red wine solids with polyphenols in a liquid state that can be related to a glass serving of red wine and more specifically, stable for transport from the source by mixing with other ingredients and composed of natural wine and grape products. Further, the concentrate and blended product ideally represent up to 30 times the polyphenolic health benefit of red wine allowing for measured blending at packaging for red wine glass equivalents in small to large containers. The resulting product has the benefit to the consumer of a wholly natural liquid source of wine polyphenolics with less than 10% the calories found in non-alcoholic wine or grape juice where analogous materials can be substituted and where additional vitamins, nutrients, flavors and energy supplements can be added.

There are four parts that makeup the composition of matter for the wine health mixture. 1) The first part is the wine extract as described above and include the polyphenols: phenolic acids, stilbenes, flavonols, flavanoids, proanthocyanins, anthocyanins and mixed tannins Application of Peyton et al, "Composition of Matter and Method of Use for Wine 11 Health Mixtures" and have a bitter astringent taste profile. 2) The second part is stabilization for long shelf life by addition of acidulants to pH 3.2 or below such as with tartaric, citric and malic acid and their salts and or possible use of a preservative. 3) The third part is neutralization of the bitterness and astringency with natural enhanced sweeteners such as stevia, erythritrol or natural sugar such as grape sucrose (rectified grape must) derived from wine's *Vitis vinifera* parent; and the fourth part added ingredients 4) that can include wine and fruit flavors such as lemon, ginger, lime, cherry; functional ingredients such as vitamin B's (B-3, B-5, B-6 B-9, B-12) and vitamin C; minerals such as potassium, calcium and magnesium; energy drink attributes such as caffeine, taurine, guarana, ginseng, 1-carnitine; carbonation and purified water or water from wine. This composition form a wine health mixture as a natural stable concentrate to transport preferably at the same proportion as blended in the packaged beverage.

There are three steps in the method of use for wine health mixtures: 6) shipping a stable concentrate with transportable and storage shelf life up to 2 years in bulk quantity (25-1000 liters; 7) packaging as a consumer packaged good by any additional blending and pasteurization with hot or cold fill for a multi-serving liquid beverage enhancer; and 8) diluting the concentrate with added ingredients and water or carbonated water to make a functional beverage.

The above composition and mixture can provide a glass of wine equivalent of polyphenols in a tasteful 5 ml (teaspoon) concentrate dispensed as a teaspoon serving taken directly; as a liquid beverage enhancer dispensed in teaspoon doses in water, beverage or food; or in multiple amounts in larger doses as a single serving ready to drink beverage. If made with enhanced sweetener a serving of one glass red wine equivalent would have less than 10 calories and with sucrose such as rectified grape must less than 30 calories per glass of red wine equivalent. There are 150-200 calories in 5 ounces of either grape juice or wine, and a teaspoon of the concentrated mixture of this invention is 5-20% the calories providing the same if not better health benefits of wine or grape juice from their polyphenolics without alcohol.

In addition, further objects and advantages among many others of this innovative invention are to provide a mixture of whole wine extract which produces a safe, tasteful and high Application of Peyton et al, "Composition of Matter and Method of Use for Wine 12 Health Mixtures" value added concentration of wine solids without alcohol and with wine polyphenols quantifiable to a glass of wine equivalent in a stable liquid form of composition whereby it can be stored and bulk transported to consumer packaging where it can be bottled directly or blended as a ready to drink beverage providing glass of wine equivalence in multi-serving bottle, for example a squeeze bottle, for use directly in teaspoon serving or in water, soda water, beverage or food, or in single serving container blended with water, soda water, beverage or other foods.

The objects and advantages as well as the structure and function of the preferred embodiments will become evident from the more detailed description of the invention and the examples.

BRIEF SUMMARY OF THE INVENTION

In accordance with the present invention a composition of matter is provided to make a mixture of whole wine extract which produces a safe, tasteful and high value added concentration of wine solids without alcohol, with minimal added water if any, and with wine polyphenols quantifiable to a glass of wine equivalent in a stable liquid form of composition whereby the concentrated base product can be stored and bulk transported to consumer packaging wherein it can be bottled directly or blended as a ready to drink beverage providing glass of wine equivalent in multi-serving bottle, for example a squeeze bottle dispensing a glass of wine equivalence per sqeeze, for use directly in teaspoon serving or dispensed in water, soda water, beverage or others foods, or in single serving container blended with water, soda water, beverage or other foods.

DESCRIPTION OF THE DRAWINGS

FIG. 1 is a table of colony forming units (cfu/mL) for Example 1.

DETAILED DESCRIPTION OF THE INVENTION—PREFERRED EMBODIMENT

Figure 2A:
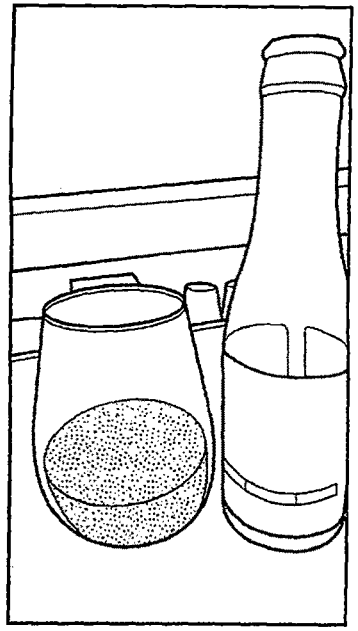
FIGS. 2A, 2B and 2C are photographs of commercial samples from Example 2.

This invention can be further divided into specific parts for the detailed description and preferred embodiment of the composition and method of use of wine health mixtures: (a) wine extracts (b) sweeteners (c) acidulants (d) preservatives (e) nutrients (f) other ingredients (g) sensory and pH (h) blending and pasteurization (i) hot fill and cold fill (j) containers (k) shelf life (1) dose measuring (m) dispensing single serving directly (n) blending multi-servings.

Composition of Concentrated Base Product (a) Wine extracts can be liquid or dry powder and quantifiable by measure of either the volume of wine required to produce a volume or mass of extract or other quantifiable means such as less preferably polyphenol content or even more less preferably antioxidant value to relate the wine to the extract. A liquid extract with dry solids content 20-55% obtained through a 20:1-45:1 (wine volume to extract mass) ratio by vacuum distillation of whole wine is preferred to minimize processing as with dry powders that require up to a dozen other processing steps. Liquid wine extract represent not only the polyphenols of wine but also the natural water of wine, the semi-volatile and non-volatile acids, carbohydrates, flavors, minerals, etc that might be obtained by a chef in a wine reduction sauce evaporating off the alcohol and water in a sauce pan over heat. Either red wine extract or white wine extract can be used in the preferred embodiment. Though more bitter and astringent, the red wine extract is preferred as it contains more polyphenols from the grape's skin and seeds the grape juice is fermented with that also results in more flavor of the grape and wine. In the preferred embodiment the wine extract has a pH 3.3-3.8 and a 25-50% dry solids content and more preferably 35-45% dry solids and 55-65% moisture. Also in the preferred embodiment a typical red wine with 1-2 gms polyphenols/liter results in a liquid red wine extract as described with 20-90 gms polyphenols/kg (2-9%) more typically 35-70 gms polyphenols/kg. In the preferred embodiment the red wine extract may have calories from the wine acids, carbohydrates and proteins.

(b) Sweeteners are added because though wine alone is acceptably astringent and sour on the palate it is more so with a concentrated wine extract as used in this invention with added acidulants for taste and preservation included. Therefore sweeteners are added to a level by organoleptic sensory taste perception to balance the astringency and sourness of the extract and final product to a desired level as routinely done with these three of the six core tastes (the other three are bitter, salty and pungent). Sweeteners can be enhanced artificial such as aspartame and sucralose with 200-500 times the sweetness of sugar, enhanced natural sweeteners such as monk fruit extract and stevia with up to 200 times the sweetness of sugar, erythrytol with 70% the sweetenes of sugar, or natural sugar (fructose-glucose and sucrose) as cane or grape sugar (rectified grape must). In the preferred embodiment both taste and a natural source for the sweetener is preferred to balance the astringency and sourness of the product and as consumer demand natural sources. Of the above sweeteners, though sucralose at 0.12-0.15% w/w gave a sweet and tangy enhanced grape taste and might work in a prepared soda to deliver the red wine equivalents, being artificial it is not in the preferred embodiment of this invention, where the sweeteners were preferred to be natural. Rectified grape must is a natural liquid from grape with 50% grape water and 50% grape sucrose by volume and required 40-60% of the volume of the product to counter the astringency and sourness of the extract diluting the concentration of the red wine extract in a dose and significantly adding to calories for a glass of wine equivalent up to 30 calories. Further it had a bland taste and appeared to mask the wine grape character. Though some consumers may prefer the natural grape wine with the natural grape sugar as all natural grape, in the preferred embodiment stevia, preferably organic stevia, was found to optimally counter the astringency and sourness of the wine extract minimizing the dilution of the concentration for a dose equivalent of 1 teaspoon equaling a glass of red wine and imparting no additional calories for a glass of red wine equivalent from the calories naturally within the liquid red wine extract. Further, the stevia with the red wine extract combined well and imparted a very slight pungent and sour taste with a more natural wine character. Therefore, in the preferred embodiment a stevia/liquid red wine extract percent weight ratio of 0.4-0.5% is preferred based on taste and dose delivery volume, more preferred 0.45-0.47% to the liquid wine extract as used in the examples as described above but can vary requiring sensory analysis.

(c) Acidulants are used for preservation, shelf life, pH reduction for cold fill 3.2 and below, and imparting a sour wine character. Natural wine pH ranges from 3.0-3.6 with red wine mostly 3.3-3.6 and wine extract 3.4-3.8 having lost volatile acids such as acetic during distillation of the alcohol. Natural wine acids include tartaric, citric and malic acids and are used as acidulants. Though potassium bitartrate, the potassium salt of tartaric acid found most often in wine can be used as a preservative and acidulant with electrolyte, it has a buffering capacity near pH 3.5, can crystallize under certain conditions, and carries calories as do the other weak organic acids, citric and malic. As part of the Krebs Cycle, citric and malic acids are natural and can reduce pH for preservation, shelf life, and cold fill with a natural flavorful citrusy sour taste character reducing pH to 3.2 and below. In the preferred embodiment slightly more citric acid was found to impart a better flavor profile in approximately a 6:5 ratio of citric to malic in total at 2-5% w/w, more preferred 3-4%, concentration relative to the weight of liquid red wine extract as described above in the most preferred wine extract embodiment. In some cases it was found that pH rose after pasteurization or sweetener additions and in such cases a readjustment of pH with the same ratio of citric:malic to the pH 3.2 or below was made.

(d) Preservatives consist of acidulants, chemical antimicrobials, carbonation, heat treatment (pasteurization), and water activity (a, is the partial vapor pressure of water in a substance divided by the standard state partial vapor pressure of water, somewhat correlated to % water). In many cases humectants such as vegetable glycerin and propylene glycol assist in reducing water activity. Wine extracts are known for antimicrobial properties and by themselves are well preserved antioxidants with shelf lives over six months including inhibition of photo oxidation. As addressed above, a pH of 3.2 or below is generally recognized to prevent microbial growth and can be cold filled. The U.S. Food and Drug Administration (FDA) has detailed the pH ranges required for the growth of several pathogens. Of human pathogens listed, most require a pH greater than 4.0 in order to grow.

Due to the high acid content of wine (low pH) alone, most human pathogenic microorganisms cannot grow. As to their survival, there is a large body of evidence that indicates *Salmonella, Listeria monocytogenes*, and *E. coli* have the capacity to acclimate to acidic conditions, developing some level of resistance to acids. However, research suggests that vegetative pathogens present at the pH levels of wine likely die-off quickly within a few hours to a few days at room temperature. In addition, while the survival or growth of human spore forming pathogens such as *Clostridium botulinum* and *Bacillus cereus* may be uncertain, it is clear that the spores of these organisms do not germinate and outgrow at the pH levels typical of wines. Therefore, in the preferred embodiment adjusting the final product to a pH of 3.2 or below by natural fruit and wine acidulants as described above assures the first preservative step toward a long shelf life. Secondly, preservatives such as ascorbates, benzoates or salts thereof, BHA and BHT and others can be used. However, a natural preservative is found in grape extracts and naturally occurring in vivo in the red wine extract. To assure a long shelf life contingency, a natural preservative derived from fermentation and often used in fruit juices, is polylysine. It is generally regarded as safe by the FDA and can be used as demonstrated against yeast, fungi, Gm-positive bacteria and Gm-negative bacteria. It is recommended to be added at 50-100 ppm concentration. Polylysine is reported to be slightly bitter in taste but sensory testing found no change in taste profile when added in this concentration range. Carbonation applies both the acidity of carbonic acid in solution and imparts a detrimental pressure gradient against microbial cell walls, membranes and specific molecules that disrupts and inhibits their performance. Pasteurization is commonly used to kill microbials by heat that inactivates enzymes and lyses cell walls and kills the microorganism. It is often applied in pasteurization units that are a function of time and temperature required to kill a percentage of microorganisms in a food. Flash pasteurization is a rapid rise in the temperature of a food, often as high as 85 degrees C. (185 F) briefly, with an immediate cooling, and tends to preserve taste and flavors more readily than lower temperature heat treatments over longer time intervals. As discussed above water activity is the amount of free water available in a food, not the moisture level, and water activity level less than 0.85 are found to be safe with pH less than 4.6. Cates in PCT/US2016036930 dehydrated by heat whole grape bunches and found a water activity of 0.47-0.60 with a moisture content of 50% and brix of 26-30. In the preferred embodiment of this invention the preservation for long shelf life is by a water activity less than 0.85 and acidifying the product to pH 3.2 or less, pasteurizing to 85 degrees C., and optionally adding the natural preservative polylysine at 50-100 ppm.

(e) Nutrients can be added consisting of but not limited to vitamin B's and C, and minerals such as electrolytes calcium, potassium and magnesium. In the preferred embodiment Vitamin B's are supplemented because they are relatively low in wine, are essential to the diet and are water soluble crossing the blood brain barrier but also readily excreted, and significant populations of western countries suffer from B-vitamin deficiency in their diet. B vitamins improve brain function and the nervous system, assist in hemoglobin synthesis and improve energy production in the mitochondria converting carbohydrates, proteins and fats to ATP energy, and perform other essential roles in preventing diseases such as dementia. In the preferred embodiment, of the 8 B vitamins, 5 are added but are not limited to the following as supplement to a serving of a glass of wine equivalent: Niacin (Vit B3, 10-50% DV, 2-10 mg/serving), Pantothenic Acid (Vit B5, 10-100% DV, 1-10 mg/serving), Pyroxidine HCl (Vit B6, 10-100% DV, 0.2-2 mg/serving), Folic Acid (Vit B9, 25-100% DV, 0.04-0.4 mg/serving), Cyanocobalamin (Vit B12) (50%-500% DV, 0.003-0.03 mg/serving). Potassium bitartrate is derived from grape fermentation processes and can serve as both an electrolyte and an acidulant and is also included in a preferred embodiment as well as water soluble cannabidiol at a dose of 2.5-10 mg per serving.

(f) other ingredients can include, but are not limited to: natural flavors such as the wine or essence of grape wine cabernet sauvignon (red) and chardonnay (white); fermented grape alcohols such as cognac and brandy up to 0.5% alcohol by volume; fruit flavors such as orange, lemon, lime, mango, pineapple, cherry; functional ingredients such as energy drink attributes as caffeine, taurine, guarana, ginseng, l-carnitine; sleep aids such as melatonin, serotonin and tryptophan; non-psychoactive water soluble cannabidiol derivatives from hemp such as purified CBD and broad spectrum hemp extract that are thought to relieve anxiety and reduce inflammation; resveratrol as a simulated or single purified wine polyphenolic or similar purified polyphenols such as pterostilbene as well as Provinol®; ingredients that might impart a bitter hot taste on a Stovall scale; and purified water or water from wine, non-carbonated and carbonated. In the preferred embodiment water of wine is naturally present up to 60% within the liquid wine extract or grape sugar (rectified must) but may be added to a dry wine extract or if necessary used together with purified water to make up the concentrate product to a predetermined volume to provide a serving of a glass of wine equivalent in a predetermined unit volume of concentrated base product.

(g) Sensory and pH tests are performed on the concentrate base product after a sample pasteurization to assure quality and to readjust pH to 3.2 or below if necessary before blending and pasteurization. In the preferred embodiment the sensory and pH tests are performed before blending and pasteurization to identify any adjustments for blending the concentrated base product for final use.

Method of Use of Concentrated Base Product (h) Blending mixes the concentrated base product in a 250-5000 liter stainless steel mix tank with any added ingredients for adjustment of taste and pH and then pasteurized. Pasteurization is a means of extending the shelf life and preserving the product. Pasteurization is commonly used to kill any microbials in the product before packaging by heat that inactivates enzymes and lyses cell walls and kills the microorganism. It is often applied in pasteurization units that are a function of time and temperature required to kill a percentage of microorganisms in a food. Flash pasteurization is a rapid rise in the temperature of a food, often as high as 85-95 degrees C. (185-203 F) briefly, with an immediate cooling, and tends to preserve taste and flavors more readily than lower temperature heat treatments over longer time intervals. In the preferred embodiment, blending and pasteurization of the concentrated base product is performed before packaging.

(i) Hot fill and cold fill is performed depending on the predetermined final product pH and container. If a package is hot filled at 80-85 degrees C. (175-185 F) and the package is inert to heat, the heat of the product from pasteurization is also carried into the packaging to kill the microflora within the container to prolong shelf life without damaging or leaching from the container. If a package is cold filled, the product is first pasteurized then cooled and the container, having been previously disinfected and rinsed, is filled at ambient temperature as long as the final product meets the cold fill requirements of acidification to pH 3.2 or less. In the preferred embodiment of this invention either hot fill or cold fill is performed.

(j) Containers are predetermined, and compatible for either cold fill or hot fill and range from but not limited to 40 ml-1000 liters. They can be made of plastic, aluminum or glass and are disinfected before hot fill or cold fill. For bulk transport of concentrated base product with cold fill, a container size of 25-1000 liters can be made of, but not limited to, a rigid polypropylene or polyethylene construction, where disinfection is performed by, but not limited to, a liquid such as an acid sanitizer for surface contamination and triple rinsed following disinfection; or steam cleaning; or gas disinfected and triple purged. It is preferred for hot fill of concentrated base product, a heat resistant single use flexible pre-disinfected bag is used in collapsible containers that are generally regarded as safe to temperatures of 95 degrees C. In the preferred embodiment for bulk transport of a concentrate base product, a disinfected rigid liquid container size of 25-1000 liters is used for cold fill in what is commonly referred to as an IBC Tote. For cold filled multi-serving bottle as a consumer packaged good, a disinfected container of 40-100 ml size is preferred, more preferably 40-75 ml for a 5-10 serving squeeze bottle dispensing 2-10 ml per squeeze, more preferably 4-6 ml per squeeze of concentrated base product. For institutional stock use such as cafeteria, restaurant or bar, a larger glass or squeeze bottle may be used. For hot filled single use bottle of dietary supplement containing 2-3 servings per bottle of a more dilute blended base product, a 40-100 ml nutraceutical bottle, more preferably a 50-80 ml nutraceutical bottle, is used to dispense a single serving of a more dilute blended base product. For cold or hot filled single use bottle containing 1-3 wine glass equivalence per bottle as a more dilute blended base product beverage, a 150-750 container in glass, aluminum or plastic is preferred, more preferably a 250-500 ml aluminum or plastic container.

(k) The shelf life of the concentrated base product is designed to be as long as possible, through acidulation, water activity, natural preservatives both within wine extract and as added, and pasteurization. The concentrated base product when hot or cold filled directly in containers should carry stability for at least 1 to more than 2 years shelf life. When blended and diluted to make a ready to drink carbonated or non-carbonated beverage, carbonation and pH<3.5 would be expected to extend its shelf life well beyond one year and a non-carbonated beverage with pH<3.8 and preservative, a shelf life up to one year or more. In the preferred embodiment of this invention a concentrated base product is made with a predetermined level of necessary ingredient to assure the more diluted and blended final product has maximum shelf life.

(l) dose measuring a serving is based on the stoichiometric relation of the volume of wine to produce the concentrated base product in the first instance, or polyphenol concentration in the second, and a less accurate antioxidant measure in the third. In the preferred embodiment dose measuring a serving is based on the stoichiometric relation of the volume of wine to produce the concentrated base product to equal a glass of wine. In the preferred embodiment a use of 2-3 servings a day equal to 2-3 glasses of red wine a day and recommended daily values according to FDA for other nutrients, such as but limited to Vitamin B's, are recommended.

(m) dispensing a single serving dose equivalent of a glass of wine is performed directly by the consumer from a multi-serving squeeze bottle by squeezing a 40-75 ml bottle so that the concentrated base product flows through a nozzle and valve pre-calibrated to approximate the desired volume from an average squeeze that dispenses from a 5-10 serving squeeze bottle 2-10 ml per squeeze, more preferably 4-6 ml per squeeze of concentrated base product onto food as the consumer desires according to taste. Ready to consume food that can receive a dispensing consist of, but not limited to, water, carbonated water, water of wine, mineral water, flavored soda water, functional beverages, water in home carbonating devices such as a Soda Stream®, super health food smoothies mixed in blenders, on top of or mixed in dairy products such as ice cream and yoghurt, on salads as a dressing supplement, in food preparation by a sous chef for a sauce and otherwise as the consumer desires. In the preferred embodiment, dispensing a dose equivalent of a glass of wine by 1-2 squeezes (1-2 teaspoons) into a 150 ml glass of water in a wine glass results in a low calorie one glass of wine benefit without alcohol that appears as red or white wine.

(n) blending multi-servings are similar to dispensing a single serving of concentrated base product but in measured multiple amounts to a predetermined number with a blended dilution of the concentrated base in a container as a ready to drink beverage. In the preferred embodiment a still or sparkling red or white Eau de Vin® (wine water) is made at 25-40:1 dilution with purified water in 150-750 containers of glass, aluminum or plastic.

The invention is further described by way of the following non-limiting examples.

BRIEF DESCRIPTION OF EXAMPLES

Example 1

(a) To one liter (kilogram) of processed non-carbonated water of wine made by Peyton et al (U.S. Pat. No. 7,569,146 "By Products from Fermentation Still Bottoms") at neutral pH (app. 7.0) was added 5 gms of potassium bitartrate made from wine reducing the pH to 3.45 and cold filled into a nutraceutical vial, then incubated at 37 degrees C. for 30 days to accelerate microbial growth to approximate a six month shelf life then analyzed for microbial activity. (b) A 60 ml sample of the concentrate was diluted with 940 ml purified water and carbonated in a Soda Stream® to approximately 3 bar making a sparkling wine water beverage with wine potassium electrolyte of approximate 63 mg/i. A sample was cold filled into a 187 ml glass bottle, sealed with a crown cap and incubated and analyzed as above. (c) 16.3 gms of a polyphenol concentrated dry red wine extract powder (Provinol® 70% red wine polyphenolics) was added to one liter of processed water of wine with 5 gms of potassium bitartrate to make a polyphenolic concentrate approximately 5-10× the concentration of polyphenols (12 gms/liter) found in red wine, cold filled in vials, incubated and analyzed as above. (d) A sample of (c) was diluted to 20% of its concentration with purified water to make a concentration of polyphenols found in red wine (2.4 gms/liter) and (e) further diluted to 6% to make a carbonated beverage. (f, g, h) The above was repeated with pasteurization to 85 degrees C. and hot fill of the (c) concentrate to makeup and f, g, h incubated and analyzed as above. (i, j, k, l, m, n) the above (c) was again repeated but with (i) 364 gms rectified grape must (as 400 ml of 66.7 brix grape must concentrate at density 1.335) and madeup to 1 liter with processed water of wine mixing in 5 gins of potassium bitartrate and 16.3 gins Provinol® reducing the concentrates mixture's pH to 3.1 and the samples incubated in a 37 degree C. water bath and analyzed as above for accelerated shelf life testing to approximate a 6 month shelf life. -FIG. 1 show that in all cases after incubation the pH rose, potassium bicarbonate alone with water as a stabilizer was unsuitable except when carbonation was performed, and when grape sugar was added pH was suitable for cold fill but rose after incubation from pH 3.1 to above an aseptic pH of 3.2 for long term stability. Further the moisture level determined empirically for the concentrates were (c) greater than 95% for the non-grape sugar added; and (i) greater than 70% for the grape sugar added indicating a probable water activity of >0.85 unsuitable for stability as an acidified product except when carbonated. In addition to the above, a concentrated resveratrol (Pteropure) was substituted for the Provinol® in carbonated product (n) and small white flocs were observed in the sample.

Example 2

Figure 2B:
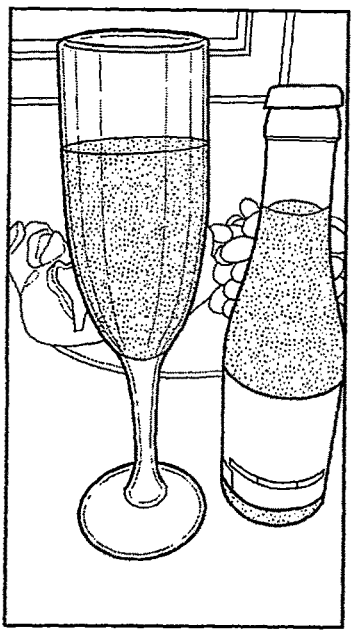
Figure 2C:

A dry red wine extract (RWE) powder (from wine concentration and solidified in a 4:1 dextrin matrix) and a dry white extract (WWE) powder (from white grape seeds) were obtained from UDM (South France) with an antioxidant value (ORAC-u mol TE/100 gm) of 2,080 and 12,000 respectively. These powders were equated to an approximate 150 ml glass of red wine equivalent ORAC of 5200 by mass, or 2.5 gm red powder and 0.43 gm white powder respectively. By organoleptic sensory tests the amount of grape sugar (66.7 brix rectified grape must concentrate at density 1.335) and wine potassium bitartrate to produce a tasteful carbonated beverage and the more concentrated syrup to make it before blending and dilution was determined. It was found a blended and pasteurized, hot filled syrup concentration of 34 RWE gm/liter, 115 gm/liter (86 ml) rectified grape must, and 2.5 gm/liter potassium bitartrate at pH 3.45 gave the optimum taste when 74 ml of syrup was added to makeup 150-175 ml carbonated beverage (ORAC 5200) for a Sparkling Red Eau de Vin® (wine water) glass equivalent. Based on sensory tests alone it was also found a blended and pasteurized, hot filled syrup concentration of 5 WWE gm/liter, 35 gm/liter (46 ml) rectified grape must, and 2.5 gm/liter potassium bitartrate at pH 4.1 gave the optimum taste when 74 ml of syrup was added to makeup 150-175 ml carbonated beverage (ORAC 4400) for a Sparkling White Eau de Vin® (wine water) glass equivalent. The products have 28 Calories and 12 Calories, respectively, with a red wine and white wine appearance. Commercial samples are pictured from May-July 2017 in FIG. 2A, 2B, 2C.

Example 3

A liquid red wine extract ($EVR_{42}$) from a 35:1 (35 liter=1 kilogm) whole red wine vacuum distillation concentrate was obtained from GrapSud (South France) reporting 60% moisture and 40% solids with a pH of <3.8 (test at 55% moisture and 45% solids with a pH of 3.5) with 1330 Calories/kg, brix 40-45, and density 1.15-1.19. A purified water solution was made up to one liter after 53 ml of $EVR_{42}$ (63 gm equivalent to 2.2 liters of red wine), 113 ml rectified grape must, 0.95 gins citric acid, 0.65 gins potassium bitartrate and 0.125 gins ExGrape® Total (GrapSud, ExGrape® Total, 92% grape polyphenolics) were mixed together. The solution was pasteurized and hot filled into a 75 ml nutraceutical vial. A pH of 3.3 resulted with a positive sensory grapewine flavor equivalent to 165 ml glass of red wine in the nutraceutical vial. To this one liter mixture was added 800 mg of caffeine powder, and Vit B3, B5, B6, B9, B12 to equal daily values (DV) of 50%, 100%, 100%, 100% and 500%, respectively in a 74 ml nutraceutical vial. The additions of caffeine and Vit B's had no effect on taste or pH. An addition of a natural lemon fruit flavor gave a slight hint of lemon and somewhat masked the grapewine flavor.

Example 4

Figure 2D:
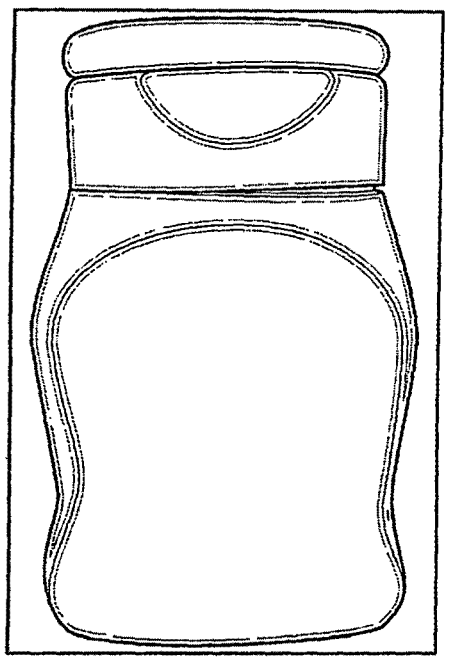
FIGS. 2D and 2E are photographs of a method of use from Example 4.
Figure 2E:
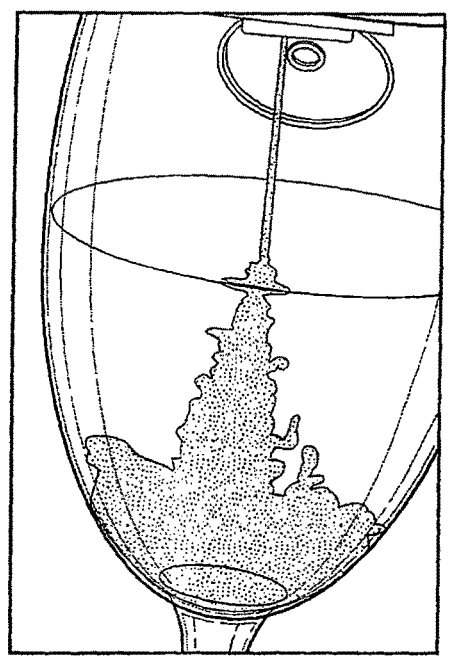

From the same as above Example 3 liquid red wine extract ($EVR_{42}$), 455 ml was added with 530 ml of rectified grape must from the same as above Example 1 and mixed. No water was added or if in the event makeup was required water of wine was used. To this was added and mixed 0.55 gms exGrapeTotal, 9.5 gms citric acid, 8.3 gms malic acid, 9.5 gms potassium bitartrate, and Vit B3, B5, B6, B9, B12 to equal 13%, 25%, 25%, 25%, and 125% DV in a 10 ml serving. It was pasteurized to 85 degrees C., cooled, pH measured at 3.1 and 50 ml cold filled into a 65 ml disinfected squeeze bottle illustrated below with cap closed covering nozzle and valve illustrated open in the dispensing below (for this nozzle and valve, 2 men and 2 women averaged 10 squeezes for 50 ml or 5 ml-1 tsp-per squeeze, a dispensing range from 3.5-6.5 ml a squeeze but more often 4-6 ml a squeeze). A 10 ml serving has 27 Calories and is the equivalent of a 186 ml glass of red wine. Taste testing was performed by dispensing 2 squeezes as a liquid beverage (water) enhancer into 150 ml water, soda water, Sparkling Eau de Vin® and beverages such as diet cola and plain cola, wine and alcoholic spirit beverages including a 13% ABV grape vodka drink. Except in the case of purified, carbonated and some spring waters, where pH dropped below 3.0, a stable pH of 3.0-3.5 was observed in the beverage when enhanced directly with a squeeze of this concentrated base product as illustrated in FIGS. 2D and 2E. Pure cane sugar was substituted for the equivalent sucrose brix content of rectified grape must by diluting in purified water resulting in a more sweet and bland base concentrate. Pure cane sugar was attempted to maximize the concentration of liquid red wine extract ($EVR_{42}$), and created a slurry that did not maintain form.

Example 5

From the same as above Example 3 liquid red wine extract ($EVR_{42}$), 940 ml was added with 1.62 gins of sucralose and mixed. No water was added or if in the event makeup was required water of wine was used. To this was added and mixed 1.9 gms exGrapeTotal (GrapSud), 16 gms citric acid, 14 gms malic acid, 5 gms potassium bitartrate, and Vit B3, B5, B6, B9, B12 to equal 13%, 25%, 25%, 25%, and 125% DV respectively in a 5 ml serving. It was pasteurized to 85 degrees C., cooled, pH measured at 3.1 and 50 ml cold filled into a 65 ml disinfected squeeze bottle and capped illustrated as above. A 5 ml serving has 9 Calories from $EVR_{42}$. A 5 ml squeeze (1 tsp) of the concentrate is the equivalent of a 192 ml glass of red wine. Taste testing was performed by dispensing 1 squeeze as a liquid beverage (water) enhancer into 150-200 ml water, soda water, Sparkling Eau de Vin® and beverages such as diet cola and plain cola, wine and alcoholic spirit beverages including a 13% grape vodka drink. Users tended to add an amount to their taste preference. Except in the case of purified, carbonated and some spring waters, where pH dropped below 3.0, a stable pH of 3.0-3.5 was observed in the beverage when enhanced with this concentrated base product. Six squeezes were added to one liter purified water and was carbonated in a Soda Stream@, bottled and crown capped in 167 ml split champagne and 12 ounce glass beer bottle, and tasted comparable to a 5 ml squeeze in soda water or added to Sparkling Eau de Vin®.

Example 6

From the same as above Example 3 liquid red wine extract ($EVR_{42}$), 940 ml was combined with 5.1 gms of organic stevia (Sweet Leaf, Organic SG95RebA60) and mixed. No water was added but if in the event makeup water was required water of wine was used for the concentrate. To this was added and mixed 2 gins exGrapeTotal, 25.5 gms citric acid, 21.8 Application of Peyton et al, "Composition of Matter and Method of Use for Wine 25 Health Mixtures" gms malic acid, and Vit B3, B5, B6, B9, B12 to equal 13%, 25%, 25%, 25%, and 125% DV, respectively, in a 5 ml serving. It was pasteurized to 85 degrees C., cooled, pH measured at 3.2 and 50 ml cold filled into a 65 ml disinfected squeeze bottle and capped illustrated as above. A 5 ml serving has 9 Calories from $EVR_{42}$. A 5 ml squeeze (1 tsp) is the equivalent of a 192 ml glass of red wine. Taste testing was performed by dispensing 1 squeeze as a liquid beverage (water) enhancer into 150-200 ml water, soda water, Sparkling Eau de Vin® and beverages such as diet cola and plain cola, wine and alcoholic spirit beverages including a 13% grape vodka drink. Users tended to add an amount to their taste preference. A teaspoon was taken directly by several tasters but was strong and astringent without dilution but palatable. Except in the case of purified, carbonated and some spring waters, where pH dropped below 3.0, a stable pH of 3.0-3.5 was observed in the beverage when enhanced with this concentrated base product. Six squeezes were added to one liter purified water and was carbonated in a Soda Stream, bottled and crown capped in 167 ml split champagne and 12 ounce glass beer bottle, and tasted comparable to a 5 ml squeeze in soda water or Sparkling Eau de Vin®.

A range of mixtures of combined organic stevia/erythritol did not improve the flavors nor did humectants such as propylene glycol and vegetable glycerin, the latter reducing a glass of red wine equivalent should concentrations be added as a humectant to reduce water activity. These added levels might be 35-40% of the mass or as equivalent to Example 4 use of rectified grape must that is 50% of the volume.

Example 7

The powder Provinol® of Example 1 and the dry white grape seed extract (WWE) of Example 2 (each roughly 75% polyphenols) were measured to equal 30 times the quantity found in 0.25 liter of red wine (8.75 grams) so that a 5 ml serving would equal a glass of red wine polyphenolics. Increments of organic stevia and sucralose were blended in until a neutral taste was obtained (approximately 0.1 gram of organic stevia and 0.035 gram of sucralose to the 250 ml solutions). Though with the benefit of 0 calories, the concentrations of each produced sediment and the taste profile of each were more sweet tannin tea flavored Application of Peyton et al, "Composition of Matter and Method of Use for Wine 26 Health Mixtures" than grape wine and the powders were felt unsuitable at the 35 gram/l concentration as a concentrate to enhance water at a 5-10 ml dose.

Example 8

To the concentrated base product of Example 7 was added 100 ppm of the natural preservative organic polylysine and as for the above pasteurized, cold filled into the same squeeze bottle and capped and had no effect on pH or taste.

Example 9

To 45 ml of the concentrated base product of Example 6 was added 50 mg in 5 ml of water soluble broad spectrum hemp extract (cannabidiol-CBD) to make a 5 mg dose in a 5 ml squeeze and as above pasteurized, cold filled and increased the pH from 3.1 to 3.4 with minor curdling and sedimentation. An addition of 0.5 gms of citric acid reduced the pH back to 3.1 but had a bitter and tart taste profile less liked than Example's 5-7 without CBD.

Example 10

Concentrated base product samples from the natural rectified grape must sweetened red wine extract mixture (Example 4), enhanced artificial sucralose sweetened red wine extract mixture (Example 5), and enhanced natural organic stevia sweetened red wine extract mixtures (Example 6) were compared by the sensory panel by dispensing a glass of wine equivalent dose (2 squeeze for Example 4; and 1 squeeze for Examples 5 and 6) in 150 ml of water. The stevia sample had the character profile most close to wine; the sucralose profile more sweet and closer to a sweetened diet beverage; and the natural rectified grape must sweetened was bland in comparison to the other two with minimal grape wine flavor. The stevia samples with and without polylysine were analyzed for total microflora after 30 days with negative results and were preservative challenge tested for total microflora.

Example 11

A liquid white wine extract ($EVB_{42}$) from a 38:1 (38 liter=1 kilogm) from whole white wine vacuum distillation was obtained reporting 60% moisture and 40% solids with a pH of 3.5 (test at 55% moisture and 45% solids with a pH of 3.1) with 1330 Calories/kg, brix 40-45, and density 1.15-1.19. 940 ml was divided into two 470 ml batches and to one batch was added 0.82 gms of organic stevia and to the other 0.30 gins of sucralose and separately mixed. No water was added or if in the event makeup was required water of wine was used. The stevia solution pH was 3.3 and the sucralose solution was pH 3.4 after the sweetener additions and were brought down to cold fill pH 3.0 with 5 gins citric acid and 4.8 gms malic acid for stevia solution, and 12 gms citiric acid and 4.8 gms malic acid for the sucralose solution. Several sub-batches were made varying sweetness and acidulant to optimize taste at pH 3.0 for the base concentrate. After optimization Vit B3, B5, B6, B9, B12 to equal 13%, 25%, 25%, 25%, and 125% DV, respectively, in a 5 ml serving was prepared. It was pasteurized to 85 degrees C., cooled, pH measured at <3.1 and 50 ml cold filled into a 65 ml disinfected squeeze bottle and capped as illustrated as above. A 5 ml serving has 10 Calories from $EVB_{42}$. A 5 ml squeeze (1 tsp) is the equivalent of a 208 ml glass of white wine. Taste testing was performed by dispensing 1 squeeze as a liquid beverage (water) enhancer into 150-200 ml water, soda water, Sparkling Eau de Vin® and beverages. Users tended to add an amount to their taste preference. A teaspoon was taken directly by several tasters but was strong and astringent without dilution. A stable pH of 3.0-3.5 was observed in the beverage when enhanced with this concentrated base product. Six squeezes were added to one liter purified water and was carbonated in a Soda Stream@, bottled and crown capped in 167 ml split champagne and 12 ounce glass beer bottle, and tasted comparable to a 5 ml squeeze in soda water or Sparkling Eau de Vin®. Of the stevia and sucralose samples, the stevia tasted more like a wine but was bitter tart and had a dark brownish yellow color and the sucralose profile seemed to distinctly separate the sweet from the sour with the same color and taste profile.

Example 12

To the stevia and sucralose base white wine concentrate of Example 11, were added Chardonnay wine and citrus fruit flavorings; and white grape seed extract from Example 2, specifically 32 gins per liter or 150 mg polyphenolic per 5 ml squeeze into 150-200 ml water. Flavor of the wine chardonnay and citrus fruit did improve the natural taste of white grapewine but somewhat overwhelmed the taster when added at the minimum recommended dose of the manufacturer. Grape wine chardonnay was blended to make up between 0.1-4% alcohol by volume (ABV), or 1-4 ml per 150 ml glass of wine equivalent, and tasters could not tell the difference other than a slight aroma.

The grape seed extract at 15 gins per liter tended to precipitate out of the base concentrate's solution and when a 5 ml squeeze was added to 150-200 ml water, tasted astringent with pH 3.0.

The embodiments and examples presented and illustrated in this specification are intended only to instruct those skilled in the art the best way known to the inventors to make and use the innovations and inventions presented herein. Nothing in this specification should be considered as limiting the scope of the present invention. All examples presented are representative and non-limiting. The above described embodiments of the invention may be modified or varied, without departing the invention, as appreciated by those skilled in the art. In light of the above instructions and teachings. It is therefore understood that, within the scope of the claims and their equals, the invention may be practiced differently than as specifically described.

We claim:

1. A grape wine concentrate comprising a mixture of a 40-45 wt. % dry solids liquid grape wine extract, a 20-27 wt. % grape sugar, a 1.0-2.5 wt. % grape polyphenol, a 0.1-0.5 wt. % of an enhanced sweetener, stevia, and a 0.1-5.0 wt. % of a 6:5 ratio of citric to malic acid to adjust pH to below 3.2, thereby providing 1.0-2.5 wt. % natural grape polyphenol in a stable multi-serving liquid supplement without additional preservatives or made using any other preservation method, wherein 1-2 teaspoons of the grape wine concentrate into a 150 ml glass of water results in the benefits of one glass of wine with low calories and without alcohol.

2. A process for preparing and storing a grape wine concentrate, comprising:
   (1) mixing
      (a) a 40-45 wt. % dry solids liquid grape wine extract comprising 65-79 wt. % of the shelf stable liquid grape wine concentrate made by vacuum distillation,
      (b) 20-27 wt. % of a grape sugar of the grape wine concentrate,
      (c) 1.0-2.5 wt. % of a grape polyphenol of the grape wine concentrate,
      (d) 0.1-0.5 wt. % of an enhanced sweetener,
      (e) 0.1-5.0 wt. % of a 6:5 ratio of citric to malic acid to adjust pH to below 3.2,
   wherein 1-2 teaspoons of the grape wine concentrate into a 150 ml glass of water results in the benefits of one glass of wine with low calories and without alcohol, and
   (2) storing the grape wine concentrate,
   whereby a stored grape wine concentrate is stored in a predetermined sized container from 40 ml-1000 liters to serve as food and beverages supplement.

3. The method of claim 2 further comprising the step of adding vitamin components selected from the group consisting of vitamin B, vitamin C and combinations thereof.

4. The method of claim 2 further comprising the step of adding flavor components selected from the group consisting of grape, cherry, orange, lemon, lime and combinations thereof.

* * * * *